United States Patent
Kermani

(10) Patent No.: US 6,721,065 B1
(45) Date of Patent: Apr. 13, 2004

(54) METHOD AND APPARATUS FOR PRINTING IMAGES

(75) Inventor: Bahram Ghaffarzadeh Kermani, San Diego, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 786 days.

(21) Appl. No.: 09/585,118

(22) Filed: Jun. 1, 2000

(51) Int. Cl.$^7$ .................. H04N 1/40; H04N 1/407; H04N 1/409
(52) U.S. Cl. .................. 358/1.9; 358/3.1; 358/3.26; 358/521; 347/14; 347/15; 347/131; 347/251
(58) Field of Search ............... 358/1.9, 3.01, 358/3.02, 3.09, 3.1, 3.26, 501, 502, 521; 347/6, 14, 15, 16, 131, 251; 399/234, 27, 58

(56) References Cited

U.S. PATENT DOCUMENTS

| | | | |
|---|---|---|---|
| 4,803,558 A | 2/1989 | Hiratsuka et al. | 358/283 |
| 5,422,742 A | 6/1995 | Ostromoukhov et al. | 358/536 |
| 5,604,567 A | 2/1997 | Dundas et al. | 399/39 |
| 5,706,414 A | 1/1998 | Pritchard | 395/117 |
| 6,049,393 A * | 4/2000 | Knierim et al. | 358/1.9 |
| 6,343,846 B1 * | 2/2002 | Asano | 347/14 |

* cited by examiner

Primary Examiner—Scott Rogers

(57) ABSTRACT

The invention is a method and apparatus for printing images intended to appear to be of solid uniform color and intensity while conserving the amount of image-generating medium used to form the image. The method and apparatus form such images by continually reducing the amount of an image-generating medium deposited in a first portion of the image from a predetermined amount at an outer edge of the portion to a lesser amount at an inner edge of the first portion.

19 Claims, 4 Drawing Sheets

METHOD AND APPARATUS FOR PRINTING IMAGES

FIELD OF INVENTION

This invention relates generally to printed images and methods for producing such images. More specifically, the present invention relates to methods and apparatus which are capable of printing high-quality image areas using less image-generating media, such as printer ink or toner.

BACKGROUND OF THE INVENTION

Printing devices, such as ink-jet, laser and other types of printers, are widely used to reproduce and print images, such as images stored on a computer, onto printable media. Such devices generally generate images by transferring an image-generating medium, such as ink or toner, to the printable medium to form the images.

However, when producing images in this manner, certain areas on the printable medium, such as those corresponding to large areas of an image having a uniform color intensity, often receive a relatively large amount of ink or toner because of the density of the printed image in those areas. This is problematic because the amount of image-generating medium stored in printers is limited and the use of excessive ink or toner more rapidly depletes the stored medium. Because image-generating medium is cumbersome to handle, relatively expensive, and inconvenient to frequently replace, it is desirable to find a way to print image areas that appear to be of uniform color and intensity while conserving image-generating medium.

One method for conserving ink in ink-jet printers is disclosed in U.S. Pat. No. 5,706,414, issued to Pritchard. This patent describes a method of systematically and uniformly depleting non-edge pixels from an image such that less ink is used in printing the remaining pixels of the image. In this method, a rectangular array of binary flags having a set number of flags corresponding to pixels which are potential candidates for depletion is "tiled" or mapped onto all pixels of the undepleted image. Each potential depletion pixel is then tested to determine if it is an edge pixel. If the pixel is an edge pixel, it is not depleted. If it is a non-edge pixel, it is depleted. In this manner, a set number of pixels is essentially uniformly and abruptly depleted from each array mapped across the entire interior of an image.

However, the present inventor has come to appreciate that the method disclosed in Pritchard is disadvantageous for several reasons. One disadvantage is that because the depletion of pixels is essentially uniform across an image, the human eye is more likely to discern a degradation in the print quality of the image.

Recognizing this and other drawbacks of the prior art, the present inventor has perceived a need for a new and more desirable method for producing images using less ink, toner or other image-generating medium. These and other objects are achieved by the present invention as described below.

SUMMARY OF THE INVENTION

The present invention provides a method for reproducing areas of an image on a printable medium by defining the image area on the printable medium and depositing ink, toner or other image-generating media in the image area such that at least a first portion of the image area is printed by continually reducing the amount of image-generating medium deposited in the first portion from a predetermined amount at at least one outer edge of the first portion to a lesser amount at at least one virtual interior reduction edge of the first portion. In this manner, the present invention conserves a significant amount of image-generating medium while producing images which appear to the human eye to be of better quality than images generated by prior art ink-saving printing processes.

Although applicants do not necessarily intend to be bound by or to any particular theory of operation, the present invention is believed to take advantage of the operation of the neural networks of the human visual system which are sensitive to the gradients of color and intensity at the edges of a solid image area but less sensitive to the middle portion of a solid image area. As used herein, the term "solid" refers to images or portions of images that appear to be of substantially uniform color and intensity. By defining at least a portion of an area having distinct outer edges, and using a continuously reduced quantity of image-generating medium to print the portion toward its interior, the present invention uses less image-generating medium to generate what appears to be a solid area. Moreover, the effects of continuously reducing the amount of image-generating medium used toward the interior of the portion, as opposed to using a uniform reduction in the amount of medium used across the entire area, are less discernable to a viewer's eyes.

One aspect of the present invention is a method for printing an image. In a preferred embodiment, the method comprises the steps of: (a) defining an image area on a printable medium; and (b) depositing image-generating media in the image area such that at least a first portion of the image area is printed by continually reducing the amount of image-generating medium deposited in the first portion from a predetermined amount at at least one outer edge of the first portion to a lesser amount at at least one virtual interior reduction edge of the first portion.

DRAWINGS

DETAILED DESCRIPTION OF THE INVENTION AND PREFERRED EMBODIMENTS

The present invention provides a method for generating image areas, intended to be perceived as solid areas of a generally uniform color, on a printable medium while conserving the image-generating medium used to form the image. The method of the present invention preferably comprises the steps of: (a) defining an image area on a printable medium; and (b) depositing image-generating media in the image area such that at least a first portion of the image area is printed by continually reducing the amount of image-generating medium deposited in said first portion from a predetermined amount at at least one outer edge of the first portion to a lesser amount at at least one virtual interior reduction edge of the first portion.

Figure 1:
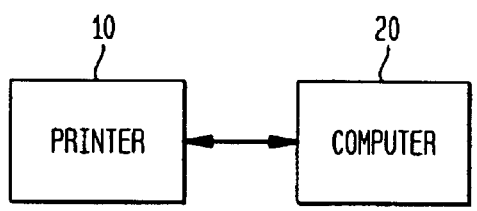
FIG. 1 is a block diagram of a printing device connected to a computer for use in one embodiment of the present invention.

The method of the present invention is applicable to any printing device which forms images by transferring image-generating medium onto a printable medium. For example, FIG. 1 is a block diagram of a printing device for use in the present invention comprising a computer printer 10 coupled to a personal computer 20. While those of skill in the art will recognize that a preferred embodiment of the present invention includes the use of a computer printer, the present invention is not limited to this embodiment. An example of another printing device to which the present invention is applicable is a plotter.

Printable medium for use in the present invention includes any medium onto which a printing device can transfer image-generating medium to form an image. Examples of suitable printable media include printer paper, overhead projector sheets, canvas, sheets of glass or wood, or any other printable media known in the art.

Additionally, image-generating medium for use in the present invention includes any medium which can be transferred from a printer to a printable medium to form an image. Suitable image-generating media include ink, toner, paint or any other image-generating media known in the art.

In general, the step of defining an image area consists of determining image data such as the size, boundaries and location of an image area relative to a printable medium and communicating this information to a printing device in preparation of printing the image area. There are numerous methods known in the art for defining an image area and any of these known methods can be used in the present invention. For example, the defining step of the present invention can be performed through electronic means, such as through the use of a computer, one or more processors or microprocessors and the like. It is well known to create images on a computer, including graphics and text images, and to communicate data relative to the areas of those images to a printer for printing onto a printable medium. In this manner, image areas created on a computer can be readily defined according to the present invention.

Alternatively, a computer or other means could be used to define an image, for example, by saving image data onto a computer disk and inserting that disk into a printer having a disk drive for receiving the disk. In this manner, the image area data saved onto the disk can be communicated to the printed without a direct coupling to a computer. Any of the aforementioned methods for defining an image, and any other methods known in the art for defining an image can be used in the present invention.

After an image area has been defined, image-generating medium is deposited in the image area to print the image area according to the present invention. In general, at least a first portion of the image area is printed by continually reducing the amount of image-generating medium deposited in the portion from a predetermined amount, preferably a maximum amount relative to the other areas of the portion, at at least one outer edge of the portion to a lesser amount, preferably a minimum amount relative to the other areas of the portion, at at least one virtual interior reduction edge.

Figure 2A:
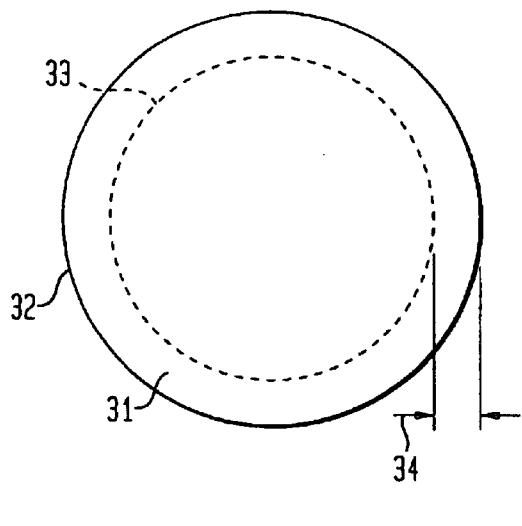
FIGS. 2a, 2b and 2c are diagrammatic sketches showing images having portions according to various embodiments of the present invention.
Figure 2B:
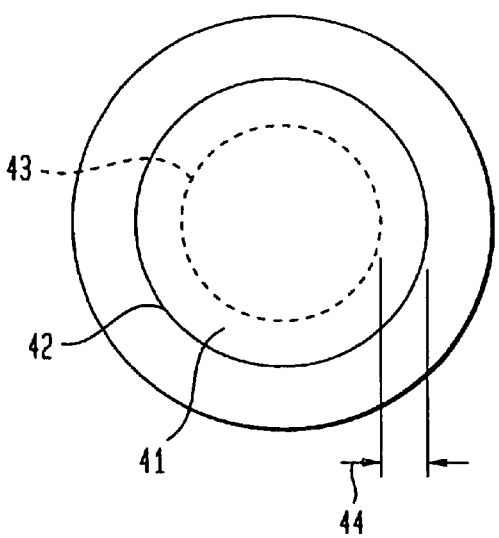
Figure 2C:
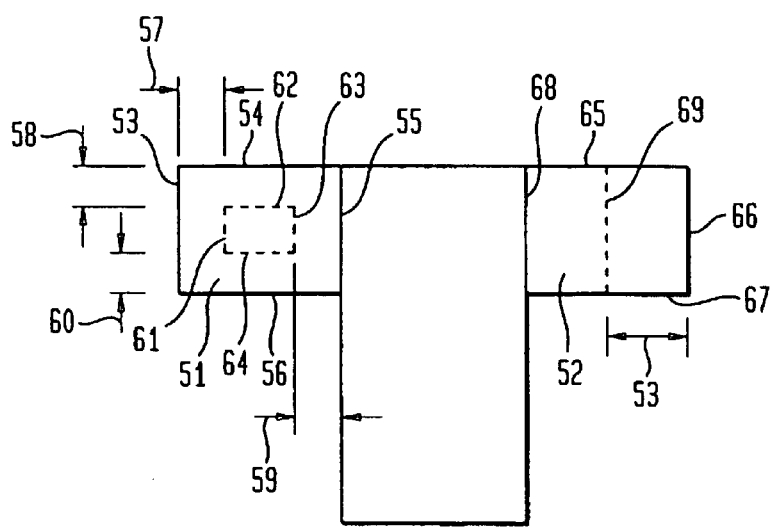

For example, FIG. 2*a* depicts a circular image having a first portion 31 which is defined by an outer edge 32 and a virtual interior reduction edge 33. Portion 31 has a predetermined distance 34 between edge 32 and edge 33. FIG. 2*b* is another circular image having a first portion 41 which is defined by an outer edge 42 and a virtual interior reduction edge 43. Portion 41 has a predetermined distance 44 between edge 42 and edge 43. FIG. 2*c* is a "T" shaped image having a first portion 51 and a second portion 52. Portion 51 is defined by outer edges 53, 54, 55 and 56 and virtual interior edges 61, 62, 63 and 64 separated from the outer edges by predetermined distances 57, 58, 59 and 60 respectively. Portion 52 is defined by virtual interior edge 69, edge 66 and the appropriate portions of edges 65 and 67 such that the image-generating medium deposited therein is reduced only from edge 66 over predetermined distance 53.

As indicated in FIGS. 2*a*–2*c*, the at least one outer edge of the portion from which the amount of image-generating medium is reduced according to the present invention can be an outer edge of the image area, such as edge 32 in FIG. 2*a* and edges 53, 54, 56 and 66 in FIG. 2*c*, or can be an edge located inside the overall image area such as edge 42 in FIG. 2*b* and edge 55 in FIG. 2*c*. Multiple outer edges of a portion according to the present invention may comprise only outer edges shared with the overall image, only edges not shared with the overall image, or combinations of outer edges shared and not shared with the image. Furthermore, the number of outer edges of the portion from which the amount of image-medium deposited in the portion is reduced can be any number from one to the total number edges defining the portion. For example, FIGS. 2*a* and 2*b* and the first portion of FIG. 2*c* illustrate portions filled from the total number of edges defining the portion. However, the amount of image-generating medium in the second portion of FIG. 2*c* is reduced from less than the total number of its outer edges. In a preferred embodiment, the portions of the present invention are printed by reducing the amount image-generating medium deposited in the portion from each of its outer edges to a virtual interior reduction edge.

The term "virtual interior reduction edge" refers to those regions in which there is a discontinuance of the reduction in the amount of deposited printing medium. At such a virtual edge, the deposition of printing medium will generally either be discontinued or sharply increased, thus creating a "virtual edge". It will be understood that the virtual edge according to the present invention may or may not be a real edge in the sense of being readily detectible by the unaided human eye at a normal distance of observation.

The predetermined distance over which the amount of image-generating medium is reduced from at least one outer edge of a portion of an image to at least one virtual interior reduction edge according to the present invention can be any distance equal to or less than the distance from an outer edge of the overall image to an interior section of the image. Preferably, the predetermined distance is equal to or less than the distance from an outer edge of the overall image to about the center of the image area. In view of the teachings contained herein, a person skilled in the art will be able to determine, without undue experimentation, the predetermined distance for any given application. In general, at any given rate of medium reduction, increasing the distance over which the medium is reduced will decrease the overall amount of image-medium used to fill a portion of the image area, and thereby increase the amount of image-medium conserved. However, as the distance is increased, the reduction of the image-generating medium generally becomes more discernable to the human eye, and the print quality of an image generally declines. Thus, although relatively longer distances are effective for conserving greater quantities of image-generating media, shorter distances may be preferred for applications where a higher print quality of an image is required.

Figure 3:
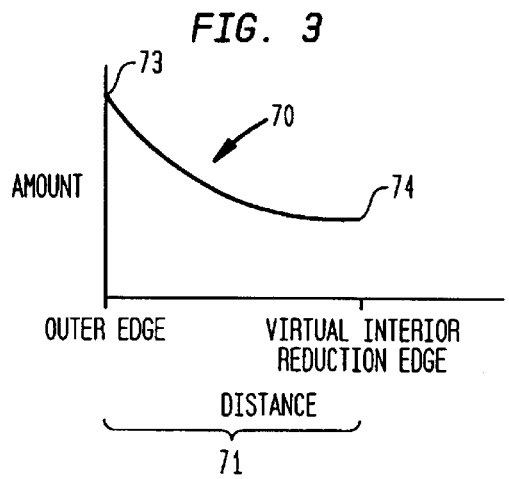
FIG. 3 is a graph depicting a color/intensity profile across a first predetermined distance according to the present invention.

Moreover, the distance of image-generating medium reduction should generally be selected in conjunction with a number of other image factors, including the desired quality of the printed image, the rate at which the amount of image-generating medium is reduced, and the maximum amount of medium used at the outer edge of the portion, such that an optimal amount of image-generating medium can be conserved while producing an image of desired print quality. As depicted graphically in FIG. 3, the amount of image-generating medium used to fill a portion of an image printed according to the present invention over a predetermined distance 71, from the predetermined amount of image-medium used at an outer edge of a portion 73 to the lesser amount of medium used at a virtual interior reduction edge 74 defines a color/intensity profile 70 over distance 71. The slope of the color-intensity profile corresponds to the rate of reduction of the quantity of image-generating medium used, and the area under color/intensity profile 70 corresponds to the overall amount of image-generating medium used across distance 71. Those of skill in the art will recognize that by varying color/intensity profile characteristics such as the predetermined distance of reduction, the rate of reduction and the predetermined amount of image-generating medium used at the portion outer edge, one can adjust both the overall amount of image-generating medium used to print at least a portion of an image area and the overall print quality of the image area.

Figure 4:
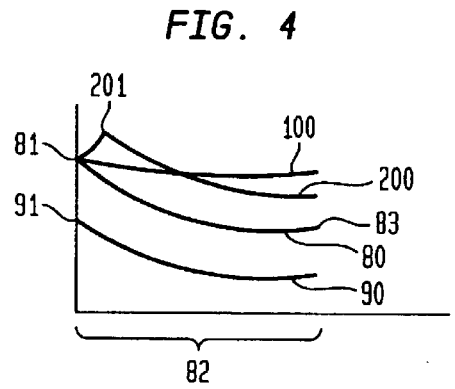
FIG. 4 is a graph depicting several color/intensity profiles across a first predetermined distance according to the present invention.

For example, FIG. 4 depicts examples of different color/intensity profiles used to fill images according to the present invention. Profile 80 is shown having a predetermined amount of image-generating medium 81 at an outer edge which is reduced over distance 82 to a minimum value at virtual interior reduction edge 83. The image-generating medium in profile 90 is reduced at the same rate and over the same distance as profile 80, but has a predetermined amount of image-generating medium 91 at an outer edge which is lower than the amount at the outer edge in profile 80. Thus, an image having a portion filled according to profile 90 would conserve more image-generating medium, but would be of a lower quality of print than an image wherein a similar portion was formed via profile 80. Profile 100, on the other hand, has the same predetermined amount as profile 80, but is reduced at a slower rate. Consequently, although an image having a portion printed via profile 100 would be of better print quality than images formed via either profile 80 or 90, such an image would provide the least amount of image-generating medium conservation. In profile 200, the amount of image-generating medium is at a predetermined level below the maximum and, after peaking at point 201, is reduced continuously to point 82. As illustrated by these examples, the variations of the image variables can be optimized by one skilled in the art for a particular application without undue experimentation.

Moreover, it is contemplated that apparatus according to the present invention can include means for selectively defining the color/intensity profile variables so that the user can optimize the method for each print job being performed. The means may include any known means capable of defining image variables including: a computer, processor, microprocessor and the like.

In general, the means for defining color/intensity profile variables can be adapted to define the variables in response to an entered command and/or image data. For example, a command such as "computer profile scaling" entered into a defining means may direct the means to define certain variables such that an image of a default print quality is printed according to the present invention. Alternatively, entering the aforementioned command may direct the means to prompt a user to enter a desired print quality or other data relating to an image to be printed according to the present invention. Upon receipt of said data, the means for defining the color/intensity variables optimizes the variables to print the image at a desired print quality while conserving an optimal amount of image-generating medium.

The commands or data entered to direct the means to define variables for printing may be any command or data programed by a manufacturer or user of the apparatus of the present invention to be recognized by the means. The commands and data may be entered by any known means including voice-activation or by touch, i.e. through buttons, pads, touch-screens or keys. For example, the desired print quality of an image may be entered directly via a scale, i.e. 1–10 wherein 1 is best quality and 10 is worst. Alternatively, a user could input the minimum distance from which viewer will be expected to view an image. Because the conservation of image-generating medium in images viewed from farther away is less likely to be discernable to the human eye, a large minimum distance ("MDIST") value may direct the computer to conserve a relatively large amount of medium in printing the image. Alternatively, a low MDIST value may instruct a computer to print a higher quality image using a color profile which conserves less image medium. Any of the above methods and any methods known in the art for directing a defining means to select an appropriate color profile can be used in accord with the present invention.

Figure 5:
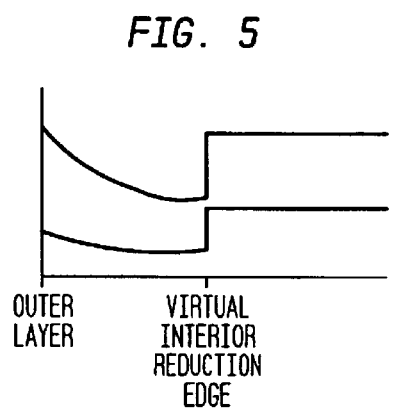
FIG. 5 is a graph depicting color/intensity profiles used to fill a profile according to the present invention.

In those embodiments wherein the first portion of the image does not comprise substantially the entire image, the remainder of the image area, or any other portion thereof, may be filled in any of a number of ways according to the present invention. For example, any portion of the remainder of the image may be filled using a constant amount of image-generating medium. The constant amount at which a portion of the remainder is filled can be any amount from about the predetermined amount at the outer edge of the first portion to about the lesser amount used at the virtual interior reduction edge of the first portion. FIG. 5 shows example color-intensity profiles for an entire portion filled in this manner. Preferably, the amount used to fill the remainder of the image according to this embodiment of the present invention is approximately equal to the predetermined amount used at the portion outer edge.

In a preferred embodiment, the amount of image-generating medium used in a second portion located in the remainder of the image is continually increased from the lesser amount at the virtual interior reduction edge of the first portion to a greater amount at a virtual interior increase edge. In this manner, the amount of medium used is smoothly increased back to a higher quantity such that the human eye is less likely to discern the variation in image medium quantity.

Figure 6A:
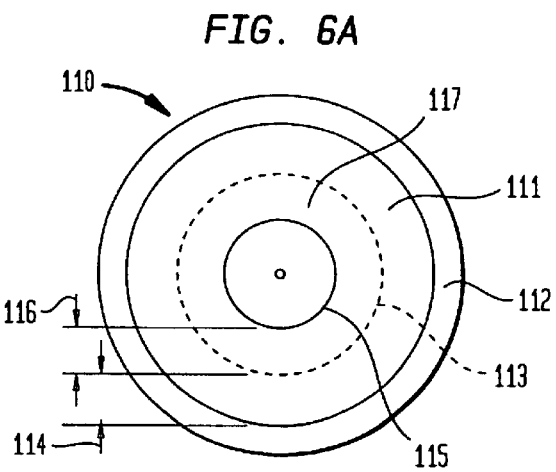
FIGS. 6a and 6b are, respectively, diagrammatic images showing an image with a portion according to the present invention having a virtual interior reduction edge and a virtual interior increase edge and a graph depicting the color/intensity profile of the portion from outer edge to virtual interior increase edge.
Figure 6B:
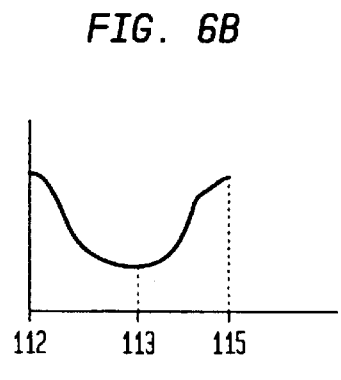

FIG. 6a shows an image 110 having a first portion 111 defined by an outer edge 112 and a virtual interior reduction edge 113. Image 110 further has a second portion 117 defined by virtual interior reduction edge 113 and virtual interior increase edge 115. Edge 113 is separated from edge 112 by a first predetermined distance 114 across which the amount of image-generating medium deposited is continually reduced from a predetermined amount at edge 112 to a lesser amount at edge 113. Edge 115 is separated from edge 113 by a second predetermined distance 116 across which the amount of image-generating medium deposited is continually increased from the amount at edge 113 to a greater amount at edge 115.

The first and second predetermined distances and the color/intensity profile across the combined distances should be selected to allow the printing of an image at the desired print quality while conserving image medium. The second predetermined distance can be any distance equal to or less than the distance from the virtual interior reduction edge to an interior section of the image. The first and second distances can be equal or different distances although, preferably, the first and second distances are approximately equal.

The amount of medium used over the second distance can be increased from approximately the amount used at the virtual interior reduction edge to essentially any quantity of image-generating medium greater than the amount used at the virtual interior reduction edge. In preferred embodiments, the amount of medium used is increased over the second distance to an amount of image-generating medium approximately equal to the predetermined amount of medium used to print the edge of the first portion.

Furthermore, the rate at which the amount of image-medium used over the second distance is increased should be selected such that the amount of image-medium conserved over the second distance is optimized while the desired print quality of the image is maintained. The amount of image medium used over the second distance can be increased at a rate equal to or different from the rate of reduction used over the first predetermined distance. In a preferred embodiment, the rate of increase is approximately equal to the rate of reduction. (Those of skill in the art will appreciate that it is the absolute value of the rates that are compared to determine whether they are the same or different, obviously a rate of reduction and a rate of increase would have opposing positive and negative values.)

Figure 7:
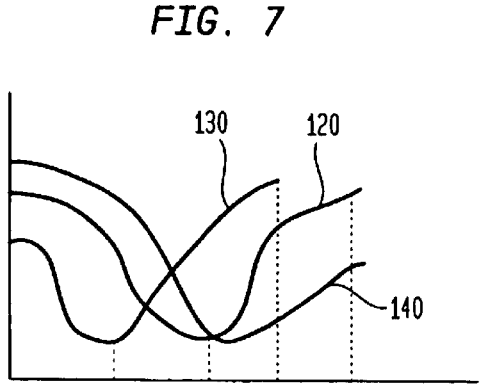
FIG. 7 is a graph depicting color/intensity profiles across a first and second distance according to different embodiments of the present invention.

FIG. 7 shows color/intensity profiles across first and second predetermined distances of image portions formed according to different embodiments of the present invention. Color/intensity profile 120 has first and second distances which are approximately equal as well as rates of reduction and increase which are approximately equal. Profile 130 has different first and second distances, but different rates of reduction and increase and different maximum values at the outer portion edge and the virtual interior increase edge. Profile 140 has approximately equal first and second distances, but different rates of reduction and increase and different maximum values at the outer portion edge and the virtual interior increase edge.

In light of the above disclosure, the color profile and predetermined distances for use in this embodiment of the present invention may be determined by one skilled in the art without undue experimentation.

In those embodiments wherein the first portion and second portions of the image do not comprise substantially the entire image, the remainder of the image area, or any other portion thereof, may be filled in any of a number of ways according to the present invention. For example, any portion of the remainder of the image may be filled using a constant amount of image-generating medium. The constant amount at which a portion of the remainder is filled can be any amount from about the predetermined distance at the outer edge of the first portion to about the lesser amount used at the virtual interior reduction edge of the first portion.

Figure 8:
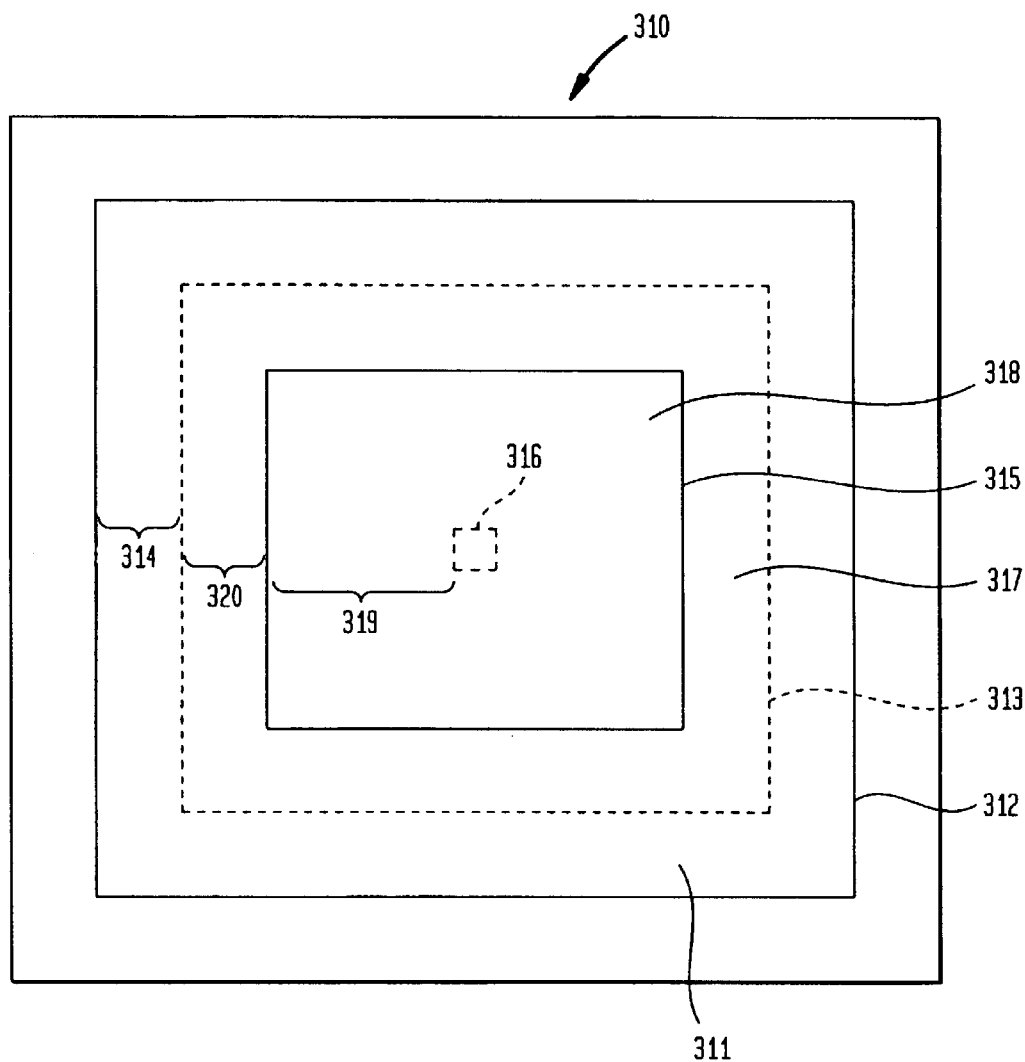
FIG. 8 is a rectangular image filled according to another embodiment of the present invention.

In a preferred embodiment, a third portion of the image area is formed using an amount of image-generating medium which is continually reduced from the amount at the virtual interior increase edge of the second portion to a lesser amount at a virtual interior increase edge. FIG. 8 shows an image 310 having a first portion 311 defined by an outer edge 312 and a virtual interior reduction edge 313. Image 310 further has a second portion 317 defined by virtual interior reduction edge 313 and virtual interior increase edge 315 and a third portion 318 defined by edge 315 and virtual interior reduction edge 316. Edge 313 is separated from edge 312 by a first predetermined distance 314 across which the amount of image-generating medium deposited is continually reduced from a predetermined amount at edge 312 to a lesser amount at edge 313. Edge 315 is separated from edge 313 by a second predetermined distance 320 across which the amount of image-generating medium deposited is continually increased from the amount at edge 313 to a greater amount at edge 315. Edge 316 is separated from edge 315 by a third predetermined distance 319 across which the amount of image-generating medium deposited is continually reduced from the amount at edge 315 to a lesser amount at edge 316.

The color profile variables for the third portion can be determined by one of skill in the art without undue experimentation as described above for the first and/or second predetermined distances.

Figure 9:
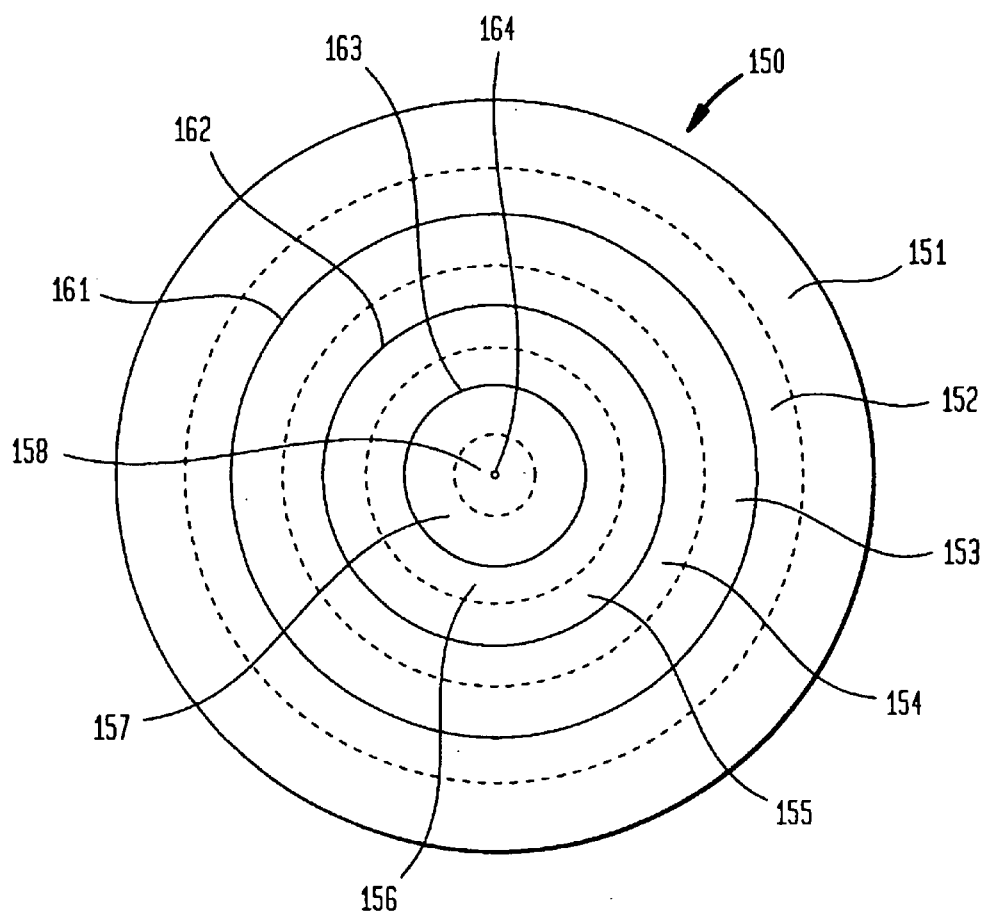
FIG. 9 is a circular image filled according to another embodiment of the present invention.

Moreover, in a particularly preferred embodiment, an image produced according to the present invention may be printed by depositing image-generating medium in multiple portions of an image thereby repeatedly reducing and increasing the amount of medium used across various distances of the image to form any number of virtual interior reduction and increase edges. For example, FIG. 9 shows a circular image 150 having eight portions, 151, 152, 153, 154, 155, 156, 157 and 158 which comprise essentially the entire image 150. Image 150 is filled such that four virtual interior increase edges, 161, 162, 163 and 164 and four virtual interior reduction edges, 171, 172, 173 and 174 are formed in the interior of the image by both reducing and increasing the amount of image medium deposited across the image four times. The distances between the virtual edges of each portion and the distance between the outer portion edge and the first virtual interior reduction edge can be the same or different. Additionally, any of the rates used to reduce or increase the amount of image medium used across those distances can be the same or different and should be chosen to reflect the desired print quality and image conservation.

The number of virtual interior reduction and increase edges used to fill an according to the present invention can be optimized by one of skill in the art for a given application without undue experimentation. Additionally, in light of the above disclosure, those of skill in the art should be able to optimize the color/intensity profile variables used in the present invention to produce a image of desired print quality without undue experimentation.

The amount of image-generating medium used to print any given portion of an image according to the present invention can be increased or reduced using any of a number of known methods for varying the amount of medium used to produce images. For example it is known to use the process of "dithering", as described in U.S. Pat. Nos. 5,422,742 and 4,803,558 issued to Ostromoukhov, et al. and Hiratsuka, et al. respectively and incorporated herein by reference, to print various shades of grey or other colors by increasing or decreasing the amount of image medium that is applied to printed pixels. Other suitable methods include hue or value variation in a hue saturation value ("HSV") system such as that described in U.S. Pat. No. 5,604,567 issued to Dundas, et al. Any of these or other known methods for varying the amount of image-generating medium used to print image areas can be used in the present invention.

The method and apparatus of the present invention can be used to print images of various shapes and sizes. For example, the present invention can be used to print small images, such as the letter "i" typed in standard Times New Roman font with a font size of 10, and even smaller images. Furthermore, the present invention can be used to print large areas, such as a solid graph area essentially filling an 8½×11 sheet of paper, or even larger areas. Any of these types of images can be printed according to the present invention having different print qualities while conserving the amount of image-generating medium used to print the image. Thus, the present invention overcomes the problems of prior art methods of printing by reducing the amount of image-generating medium used to print both relatively high and low quality printed images.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for printing an image which is intended to appear to be of solid, uniform color and intensity, comprising the steps of:
    (a) defining such an image area on a printable medium; and
    (b) depositing an image-generating medium in said image area such that at least a first portion of said area is printed by continually reducing the amount of image-generating medium deposited in said first portion of said area from a predetermined amount at at least one outer edge of said first portion to a lesser amount at at least one virtual interior reduction edge of said first portion, said at least one outer edge and said at least one virtual interior reduction edge being separated by a first predetermined distance.

2. The method of claim 1, wherein the defining step comprises utilizing a computer.

3. The method of claim 2, wherein said first portion comprises essentially the entire image area.

4. The method of claim 2, wherein at least a second portion of said image area is filled using a constant amount of image medium.

5. The method of claim 4, wherein the constant amount of image medium is approximately equal to the amount of image medium used at the outer edge of said first portion.

6. The method of claim 2, wherein at least a second portion of the image area is printed by continually increasing the amount of image-generating medium deposited in said second portion of said area from the amount at at least one virtual interior reduction edge of said first portion to a greater amount at at least one virtual interior increase edge of said first portion, said at least one virtual interior reduction edge and said at least one virtual interior increase edge being separated by a second predetermined distance.

7. The method of claim 6, wherein the first predetermined distance and second predetermined distance are about equal.

8. The method of claim 7, wherein the rate of increase over the second predetermined distance is about equal to the rate of reduction over the first predetermined distance.

9. The method of claim 6, wherein said first and second predetermined distances have a combined length which is less than the distance from the outer edge of the image area to the center of the image area.

10. The method of claim 9, wherein the greater amount of image medium at said at least one virtual interior increase edge is about equal to the amount of image-generating medium used at the outer edge.

11. The method of claim 1, wherein said predetermined amount at said at least one outer edge of said first portion is a maximum amount relative to the other areas of the portion.

12. The method of claim 1, wherein said lesser amount at said at least one virtual interior reduction edge of said first portion is a minimum amount relative to the other areas of the portion.

13. The method of claim 6, wherein said first and second portions comprise essentially the entire image area.

14. The method of claim 6, wherein at least a third portion of said image area is filled using a constant amount of image medium.

15. The method of claim 14, wherein the constant amount of image medium is approximately equal to the amount of image medium used at the outer edge of said first portion.

16. The method of claim 6, wherein at least a third portion of the image area is printed by continually decreasing the amount of image-generating medium deposited in said third portion of said area from the amount at said at least one virtual interior increase edge of said second portion to a lesser amount at at least one virtual interior reduction edge of said third portion, said at least one virtual interior reduction edge of said third portion and said at least one virtual interior increase edge of said second portion being separated by a third predetermined distance.

17. An apparatus for printing an image, comprising:
    means for defining an image area on a printable medium, said image area having at least one outer edge and a center; and
    means for depositing in said image area an image-generating medium such that the unit quantity of image-generating medium deposited on said printable medium is continuously reduced over a predetermined distance in a direction from at least one outer edge of said area toward about the center of said image.

18. The apparatus of claim 17, further comprising means for defining color/intensity profile variables of said image area.

19. The apparatus of claim 18, wherein said means for defining color/intensity profile variables comprises a computer.

* * * * *